METHOD OF PROCESSING STRESSED STEEL MEMBERS

Original Filed Jan. 16, 1963 4 Sheets-Sheet 1

| SPECIMEN NUMBER | ORIGINAL AREA, IN.$^2$ | YIELD STRENGTH (0.2% OFFSET) | | MAX. LOAD IN POUNDS | TENSILE STRENGTH PSI |
|---|---|---|---|---|---|
| | | POUNDS | PSI | | |
| 179-G | 1.227 | 170,000 | 138,550 | 189,350 | 154,300 |

HEAT NO.
29V049
BROWN-WHITE

% REDUCTION OF AREA: 33.4%
STRESS AT 0.3% ELONGATION: 95,200 = 77,600 PSI
STRESS AT 0.7% ELONGATION: 167,000 = 136,100 PSI
PROPORTIONAL LIMITS: 103,000 = 83,950 PSI
MODULUS OF ELASTICITY: 25,714,300 PSI

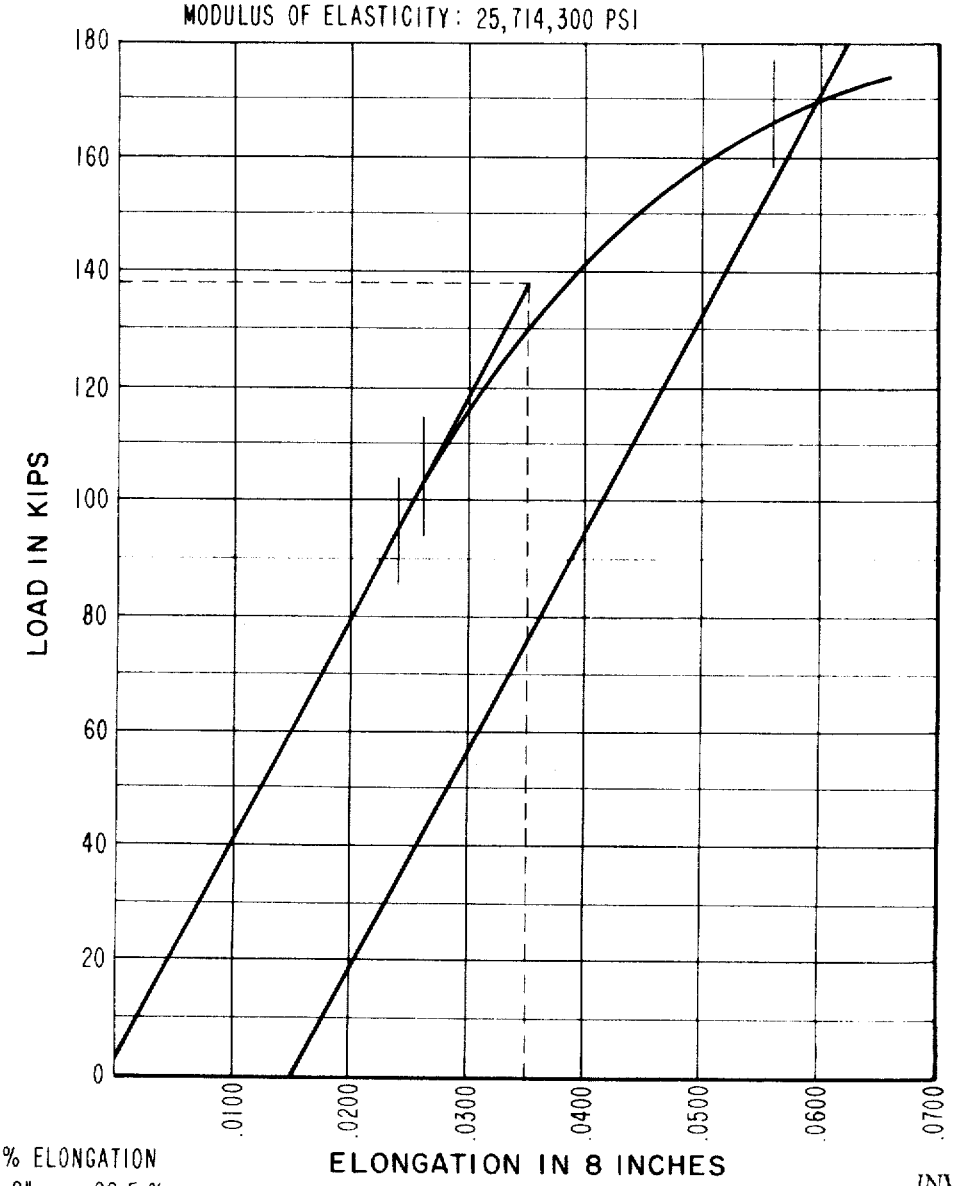

% ELONGATION
2" – 22.5 %
4" – 14.0
6" – 11.0
8" – 9.0
10" – 8.0
20D – 6.80

FIG. 1.

INVENTOR
Edward Schechter

BY
Stevens, Davis, Miller & Mosher
ATTORNEYS

METHOD OF PROCESSING STRESSED STEEL MEMBERS

Original Filed Jan. 16, 1963 4 Sheets-Sheet 2

| SPECIMEN NUMBER | ORIGINAL AREA, IN.$^2$ | YIELD STRENGTH (0.2% OFFSET) POUNDS | PSI | MAX. LOAD IN POUNDS | TENSILE STRENGTH PSI |
|---|---|---|---|---|---|
| 179-K | 1.227 | 178,600 | 145,558 | 191,400 | 155,990 |

HEAT NO. 29V049
BROWN WHITE

% REDUCTION OF AREA: 32.7%
STRESS AT 0.3% ELONGATION: 110,500 - 90,057 PSI
STRESS AT 0.7% ELONGATION: 178,600 - 145,558 PSI

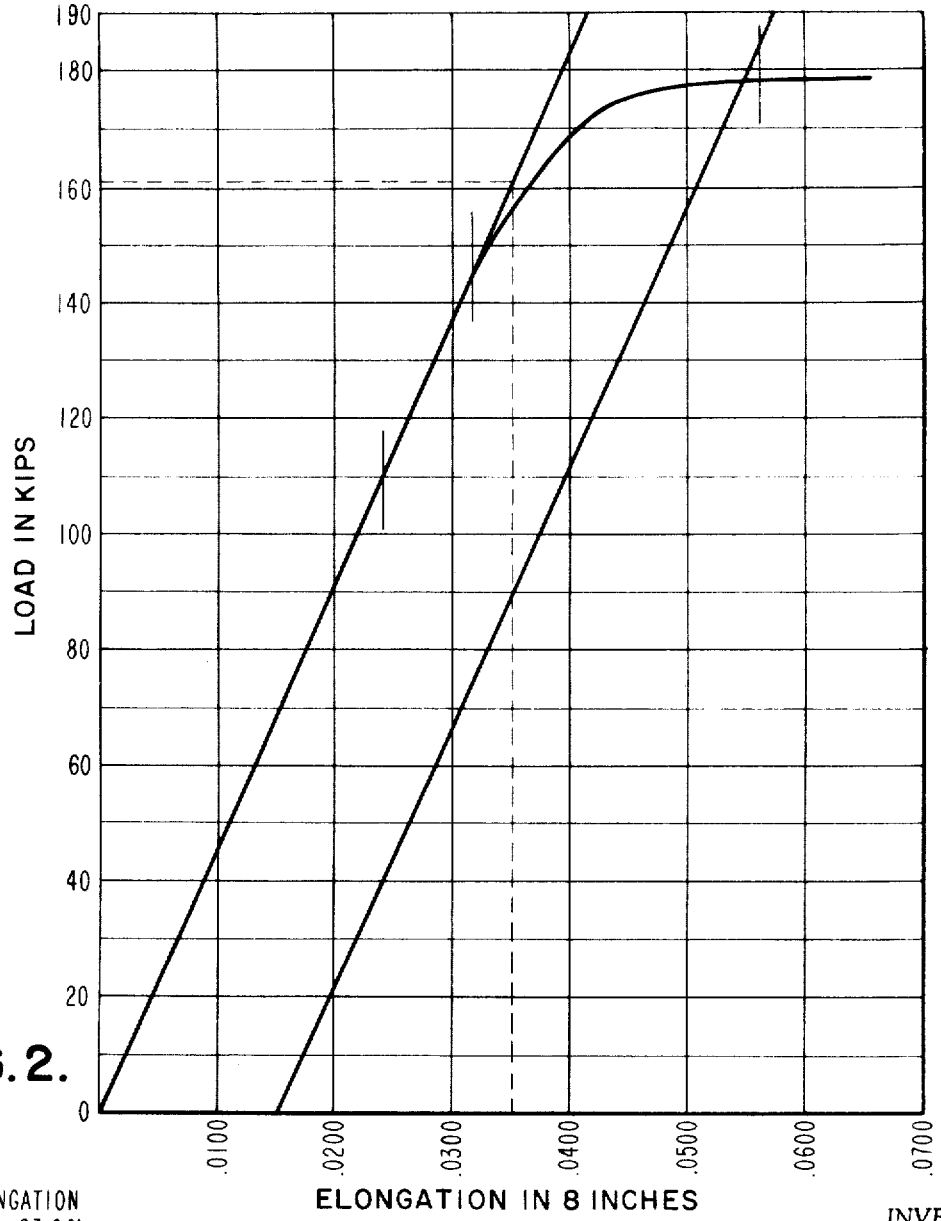

FIG. 2.

% ELONGATION
2" - 23.0%
4" - 16.0
6" - 13.0
8" - 11.0
10" - 9.6
20D - 7.0

PROPORTIONAL LIMITS:
145,000 - 118,175 PSI
MODULUS OF ELASTICITY:
29,805,500 PSI

INVENTOR
Edward Schechter

BY
Stevens, Davis, Miller & Mosher
ATTORNEYS

METHOD OF PROCESSING STRESSED STEEL MEMBERS

Original Filed Jan. 16, 1963 4 Sheets-Sheet 3

| SPECIMEN NUMBER | ORIGINAL AREA, IN.$^2$ | YIELD STRENGTH (0.2% OFFSET) | | MAX. LOAD IN POUNDS | TENSILE STRENGTH PSI |
|---|---|---|---|---|---|
| | | POUNDS | PSI | | |
| 179-V | 7854 | 111,500 | 142,000 | 126,200 | 160,600 |

HEAT NO.
27V345
BROWN BROWN

% REDUCTION OF AREA: 36.8%
STRESS AT 0.3% ELONGATION: 64,000 - 81,500 PSI
STRESS AT 0.7% ELONGATION: 111,000 - 141,300 PSI
PROPORTIONAL LIMITS: 61,200 - 77,900 PSI
MODULUS OF ELASTICITY: 27,160,000 PSI

% ELONGATION
2" - 22.5%
4" - 12.5
6" - 9.3
8" - 7.6
10" - 6.9
20D - 4.85

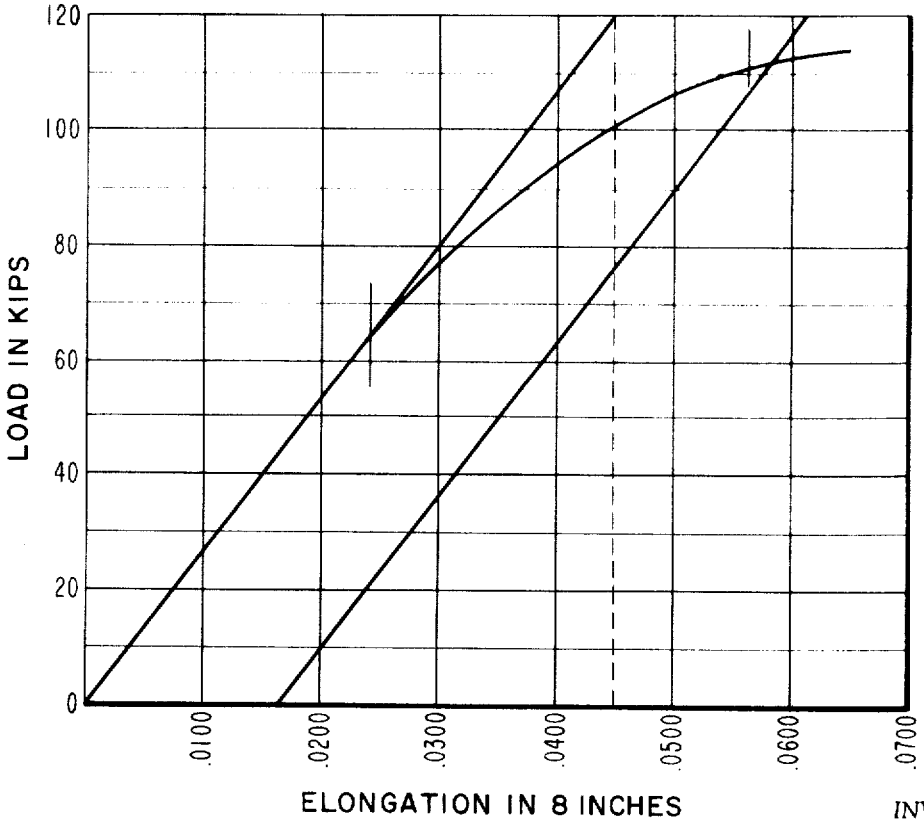

FIG. 3.

INVENTOR
Edward Schechter

BY Stevens, Davis, Miller & Mosher
ATTORNEYS

METHOD OF PROCESSING STRESSED STEEL MEMBERS

Original Filed Jan. 16, 1963 4 Sheets-Sheet 4

| SPECIMEN NUMBER | ORIGINAL AREA, IN.$^2$ | YIELD STRENGTH (0.2% OFFSET) | | MAX. LOAD IN POUNDS | TENSILE STRENGTH PSI |
|---|---|---|---|---|---|
| | | POUNDS | PSI | | |
| 179-Y | .7854 | 114,900 | 146,100 | 125,400 | 159,700 |

HEAT NO
27V345
BROWN - BROWN

% REDUCTION OF AREA: 39.9%
STRESS AT 0.3% ELONGATION: 72,800 = 92,700 PSI
STRESS AT 0.7% ELONGATION: 114,900 = 146,300 PSI
PROPORTIONAL LIMITS: 97,200 = 123,700 PSI
MODULUS OF ELASTICITY: 30,900,000 PSI

% ELONGATION
2" - 22.5%
4" - 14.3
6" - 10.9
8" - 9.4
10" - 8.0
20D - 5.15

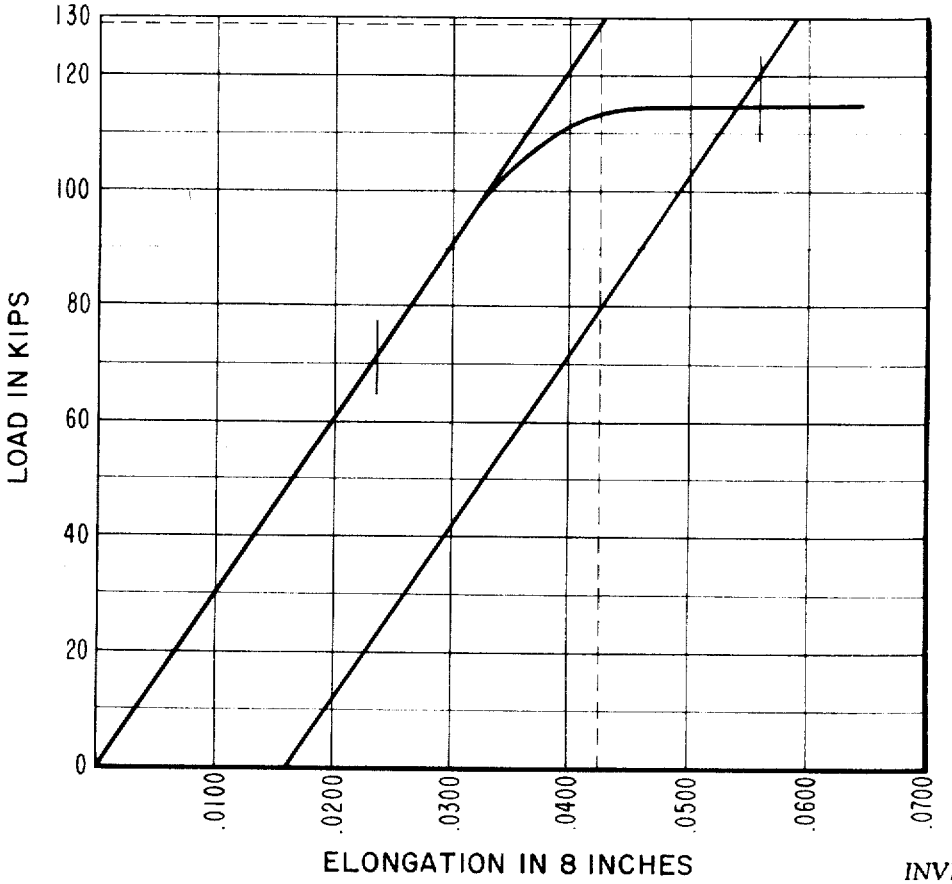

FIG. 4.

INVENTOR
Edward Schechter

BY Stevens, Davis, Miller & Mosher
ATTORNEYS

United States Patent Office

Re. 27,821
Reissued Nov. 27, 1973

27,821
METHOD OF PROCESSING STRESSED STEEL MEMBERS

Edward Schechter, Shavertown, Pa., assignor to Stressteel Corporation, Wilkes-Barre, Pa.

Original No. 3,125,469, dated Mar. 17, 1964, Ser. No. 251,951, Jan. 16, 1963. Application for reissue July 29, 1971, Ser. No. 167,298
Int. Cl. C21d *7/02, 7/14*
U.S. Cl. 148—12 1 Claim

Matter enclosed in heavy brackets [ ] appears in the original patent but forms no part of this reissue specification; matter printed in italics indicates the additions made by reissue.

*ABSTRACT OF THE DISCLOSURE*

*A method is provided for producing a high tensile strength alloy steel bar having a high proportional limit compared to its yield strength simultaneously with a predictable modulus of elasticity by cold stretching the bar to a predetermined stress of the ultimate tensile strength, stress relieving the bar by heating for a period of time at a predetermined temperature level, and thereafter cooling the bar to a predetermined temperature level.*

This invention relates to a method for processing steel members for use in prestressing and more particularly relates to a novel sequence of steps in processing without full heat treatment, steel bars of high tensile strength to attain bars having a high yield strength, predictable stress strain characteristics, a high proportional limit, while maintaining a high degree of ductility.

Prestressing, as is known, involves the external application of forces to a structure to overcome stresses caused by loads, impacts and changes in volume. Prestressing increases load bearing capacities, reduces deflection, controls cracking and economizes on materials.

The technique of reinforcing concrete by putting in steel rods with a yield point of 30,000 to 40,000 p.s.i. to take tension has been practiced for years. While improvements were constantly being made in the quality and strength of concrete, it was only in the 1940's, with the advent of prestressing with high strength steels having yield points over 130,000 p.s.i., that full use of the best concrete could be obtained.

Steel of a high tensile strength and a yield strength of 80% to 90% of the tensile strength is essential to prestressing. This type of steel is achieved by the proper chemical composition in the manufacture of steel, followed by shaping and treating operations on the steel. The purpose of these operations is to produce steel having high tensile strength and high yield strength while maintaining a high value of ductility. For example, it has been established that an increase in carbon content of a steel, in the course of producing a hot-rolled alloy bar, results in an increase in the strength and hardness of the steel but reduces its ductility.

Several methods have been used for obtaining increased yield strength in these steels of relatively high tensile strength while maintaining suitable ductility. One such method is disclosed in U.S. Patent No. 2,764,514, which generally consists of aging a non-stretchable hot-rolled alloy bar of steel containing 0.35% to 0.65% carbon to remove occluded hydrogen and then stretching the bar to at least 3% permanent elongation. This process was not satisfactory because of the upper limitation on the carbon content of the steel and its concomitant limitation upon the tensile strength of the steel, because it required that the bar be non-stretchable in its as rolled condition, because it was found that occluded hydrogen was not the only cause of non-ductile steel and because stretching the bar beyond 3% was found to reduce the ductility without any measurable advantage in other physical properties.

Another process involved, first, stress relieving hot-rolled alloyed bars which could have a carbon content in excess of 0.65% which involved furnace heating the bar for approximately 4 hours at a temperature of about 600° F. and allowing it to cool in the furnace. The bar was then linearly cold stretched to a stress of 140,000 p.s.i. utilizing a similar construction to that shown and described in U.S. Patent No. 2,764,514.

At this point, it should be noted that after processing, the steel bars or tendons are post-tensioned by prestressing. Post-tensioning of a steel bar for prestressing involves the use of hydraulic jacks. For example, in cast-in-place concrete prestressing, when the concrete surrounding the bar enclosed within a sheath has hardened sufficiently the bar is tensioned by hydraulic jacks to a stress of about 110,000 p.s.i. Such a stress is maintained in the bar by means of anchorage devices, and as a consequence, the stresses are transmitted as compression to the concrete. This stress is measured by the elastic elongation of the steel and checked against hydraulic gauges. Hence, it is important the strain or elongation of the bar be accurately predictable during the post-tensioning operation, and that the stress strain relationship up to the final point of tension be as linear as it is possible to achieve. Thus, to aid the engineer, it is customary to furnish the purchaser of post-tensioning tendons certified stress strain diagrams for each heat of steel shipped to the purchaser. Such diagrams provide information concerning the ultimate tensile strength, the yield strength, the modulus of elasticity, the proportional limit and the ductility of the particular heat of steel.

The former process described above of stress relieving followed by cold stretching failed to meet the exacting requirements of the purchaser. In typical tests for the purpose of furnishing certified stress strain diagrams for each heat of steel to be used, the modulus of elasticity was low and unpredictable, and the proportional limit of the steel was quite low compared to its yield strength. Thus, field problems were presented due to the undesirable stress strain characteristics of the steel produced by the above described process of stress relieving and then stretching the steel.

It is the purpose of this invention to provide a process of treating steel bars having superior stress strain properties as compared to those achieved by known methods. Briefly summarized, this comprises first linearly stretching a steel bar of a prescribed chemistry in its as rolled condition to a predetermined stress. The stretched bar is stress relieved by heating in a furnace in a time temperature cycle of prescribed ranges. The bar is then permitted to cool to a prescribed temperature range. This process has resulted in steel bars having a marked increase in the proportional limit, and a notable increase in the modulus of elasticity, when compared to bars treated by previously used methods. It is also believed that this process results in an increased fatigue limit in the steel bars.

In referring to a steel bar in this application there is no intention to limit the term "bar" to a length of steel of any particular cross sectional configuration. The term "bar" is intended to designate a steel member of any particular shape in cross section, but nevertheless, of a cross sectional area of from .190 square inch to 5 square inches.

In describing the present invention in the following detailed description reference is made to the accompanying drawings wherein:

FIG. 1 is a stress strain diagram of the results of a typical test of a steel bar produced in accordance with the former method of stress relieving followed by cold stretching;

FIG. 2 is a stress strain diagram of the results of a typical test of a steel bar produced from the same heat as that of FIG. 1 and being of the same diameter, the bar having been produced in accordance with the present invention;

FIG. 3 is a stress strain diagram of the results of a typical test of a steel bar from another heat of steel produced by the former method; and FIG. 4 is a stress strain diagram of the test results on a steel bar from the same heat of steel and of the same diameter as that of FIG. 3, the bar having been produced in accordance with the present invention.

In practicing the applicant's invention, hot-rolled alloy steel bars are utilized. Such bars may contain carbon ranging from 0.45% to 1.00%, but preferably should contain from 0.65% to 0.75%, and may be alloyed with [magnesium] *manganese* and chromium or other elements in amounts not in excess of 2% each.

The bars in their as rolled condition are first linearly cold stretched to a predetermined stress of 70% to 90% of the ultimate tensile strength utilizing stretching apparatus of a similar construction to the apparatus shown and described in U.S. Patent No. 2,764,514.

After stretching, the bars are stress relieved by heating them in a furnace in a time-temperature cycle varying from 1375° F. to approximately 485° F. for from 2 minutes to approximately 6 hour, depending upon either the temperature selected or the time considered to be appropriate. It has been found that the upper limit for the temperature is critical if the heating time selected is very short and that the exact temperature is less critical and greater latitude may be exercised the longer is the heating time selected. A suitable cycle is about 4 hours at a temperature of about 600° F. The bars are then allowed to cool to a temperature of approximately 150° F. or less before removal, for further processing, such as cutting the bars to desired lengths, preparing the ends for threading when needed, and coating. Such processing of the bars after removal from the furnace, of course, has no effect on the stress strain properties of the steel.

It has been found that by limiting the stretching step to a stress of from 70% to 90% of the ultimate tensile strength, the permanent elongation never exceeds 3%.

Referring to the stress strain diagrams of the drawings it will be noted that the stress of the curves is measured in kips. The tabulation of the results of the data sought, however, is converted to p.s.i. for such values as the yield strength, tensile strength and proportional limits.

It will be noted from the diagrams in FIGS. 1 and 3 that in steel bars processed to obtain high yield strength by the prior method the modulus of elasticity is less than 27.5 million. Moreover, ratio of the proportional limit to the yield strength is less than 60%. These stress strain characteristics are typical of steel bars processed by the former method.

By comparison, the stress strain characteristics as exemplified by the diagrams in FIGS. 2 and 4 relating to steel bars processed in accordance with the applicant's method show a modulus of elasticity above 29,000,000 p.s.i., similar to that obtained from as rolled steel. Moreover, the ratio of the proportional limit to the yield strength is in excess of 75%, and has been found to average between 75% to 85%. Steel bars with such stress strain characteristics enable the engineer using them to accurately predicate the elongation of the bar.

No doubt various modifications of the steel and the steps of the same sequence as the applicant's method can be made by those skilled in the art achieving the same results, which will be within the scope and spirit of the invention as defined by the appended claim.

It will be appreciated that while steel bars have been indicated herein as being applicable in prestressing, such bars may be used for other purposes where their superior stress strain characteristics may be desirable.

What is claimed is:

*1.* A method of producing a hot-rolled alloy steel bar of high tensile strength, yield strength and ductibility and having a high proportional limit compared to its yield strength together with a predictable modulus of elasticity, said method comprising providing the rolled bar with .45% to 1.00% carbon, providing the rolled bar with [magnesium] *manganese* and chromium in amounts of less than 2% each; cold stretching the bar to a predetermined stress of 70% to 90% of the ultimate tensile strength whereby the permanent elongation is less than 3%, *after said cold stretching step* stress relieving the bar by furnace heating in a time-temperature cycle varying from approximately 1375° F. to approximately 485° F. and from approximately two minutes to approximately six hour depending upon the time and temperature selected, *thereafter* cooling the bar to a temperature of approximately 150° F. or less, *prior to removal from the furnace* whereby the bar has a proportional limit of between 75% and 85% of the yield strength and a modulus of elasticity above 29,000,000 p.s.i.

References Cited

The following references, cited by the Examiner, are of record in the patented file of this patent or the original patent.

UNITED STATES PATENTS

| | | | |
|---|---|---|---|
| 894,428 | 7/1908 | Emery | 148—12 |
| 981,407 | 1/1911 | Fischer | 148—12 |
| 2,764,514 | 9/1956 | Lee | 148—12 |
| 3,053,703 | 9/1962 | Breyer | 148—12 |
| 3,196,052 | 7/1965 | Hann | 148—12 |
| 3,230,118 | 1/1966 | Tufts | 148—12 |
| 3,252,840 | 5/1966 | Tarwater | 148—12.3 |

WAYLAND W. STALLARD, Primary Examiner